(12) United States Patent
Hirabayashi

(10) Patent No.: US 9,298,366 B2
(45) Date of Patent: Mar. 29, 2016

(54) ELECTRONIC DEVICE, METHOD AND COMPUTER READABLE MEDIUM

(71) Applicant: KABUSHIKI KAISHA TOSHIBA, Minato-ku, Tokyo (JP)

(72) Inventor: Hirotada Hirabayashi, Hamura Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/547,999

(22) Filed: Nov. 19, 2014

(65) Prior Publication Data

US 2015/0278216 A1    Oct. 1, 2015

(30) Foreign Application Priority Data

Mar. 28, 2014    (JP) .................................. 2014-068839

(51) Int. Cl.
G06K 9/00    (2006.01)
G06F 3/0488    (2013.01)

(52) U.S. Cl.
CPC ........ G06F 3/04883 (2013.01); G06K 9/00416 (2013.01)

(58) Field of Classification Search
None
See application file for complete search history.

(56) References Cited

U.S. PATENT DOCUMENTS

| 5,698,822 | A | 12/1997 | Haneda et al. | |
|---|---|---|---|---|
| 7,466,859 | B2 * | 12/2008 | Chang | G06F 3/018 |
| | | | | 341/22 |
| 7,865,018 | B2 * | 1/2011 | Abdulkader | G06K 9/00429 |
| | | | | 382/115 |
| 8,918,408 | B2 * | 12/2014 | Ohtsuki | G06F 3/0237 |
| | | | | 704/243 |
| 2005/0249419 | A1 * | 11/2005 | Rieman | G06K 9/00872 |
| | | | | 382/229 |
| 2009/0174667 | A1 * | 7/2009 | Kocienda | G06F 3/0237 |
| | | | | 345/169 |
| 2009/0226091 | A1 | 9/2009 | Goldsmith et al. | |
| 2011/0040908 | A1 | 2/2011 | Ikeda et al. | |
| 2012/0139859 | A1 | 6/2012 | Ohira et al. | |
| 2012/0299701 | A1 * | 11/2012 | Zou | G06F 21/31 |
| | | | | 340/5.54 |
| 2015/0035765 | A1 | 2/2015 | Hirabayashi | |
| 2015/0135065 | A1 | 5/2015 | Hirabayashi et al. | |
| 2015/0242114 | A1 | 8/2015 | Hirabayashi et al. | |

FOREIGN PATENT DOCUMENTS

| JP | 06-251187 | | 9/1994 |
|---|---|---|---|
| JP | 07-121662 | | 5/1995 |
| JP | 07-311817 | A | 11/1995 |
| JP | 09-120433 | | 5/1997 |
| JP | 09-319504 | A | 12/1997 |

(Continued)

OTHER PUBLICATIONS

U.S. Appl. No. 14/268,777, filed May 2, 2014, Hirabayashi.

(Continued)

*Primary Examiner* — Jayesh A Patel
(74) *Attorney, Agent, or Firm* — Knobbe, Martens, Olson & Bear LLP

(57) ABSTRACT

According to one embodiment, an electronic device determines, in response to completion of input of Mth stroke, first input candidates of stroke groups by using the 1st to Mth strokes; executes process for displaying at least one of the first input candidates; determine, in response to completion of input of Nth (N>M) stroke, second input candidates by using the 1st to Nth strokes; and executes, process for displaying at least one of the second input candidates on the screen to eliminate overlap with the at least one of the first input candidates displayed on the screen.

14 Claims, 11 Drawing Sheets

(56) References Cited

FOREIGN PATENT DOCUMENTS

| | | |
|---|---|---|
| JP | 10-171589 | 6/1998 |
| JP | 2000-187658 | 7/2000 |
| JP | 2000-215270 | 8/2000 |
| JP | 2000-348141 | 12/2000 |
| JP | 2005-025566 | 1/2005 |
| JP | 2005-190199 | 7/2005 |
| JP | 2007-213416 | 8/2007 |
| JP | 2007-265171 | 10/2007 |
| JP | 2008-186056 | 8/2008 |
| JP | 2009-146273 A | 7/2009 |
| JP | 2009-223430 A | 10/2009 |
| JP | 2012-098891 | 5/2012 |
| JP | 2013-544612 | 9/2013 |
| WO | WO 2005/004041 | 1/2005 |
| WO | WO 2007/094078 | 8/2007 |
| WO | WO 2011-079417 A1 | 7/2011 |
| WO | WO 2015-015644 A1 | 2/2015 |

OTHER PUBLICATIONS

First Office Action mailed by Japan Patent Office on Sep. 9, 2014 in the corresponding Japanese patent application No. 2013-544612, in 7 pages.

International Search Report mailed by Japan Patent Office on Aug. 27, 2013 in the corresponding PCT application No. PCT/JP2013/071041, in 9 pages.

Decision of Rejection mailed by Japan Patent Office on Feb. 17, 2015 in Japanese Patent Application No. 2013-544612—6 pages.

The Extended European Search Report Issued by European Patent Office on Mar. 13, 2015 in the European Patent Application No. 14166091.0—9 pages.

* cited by examiner

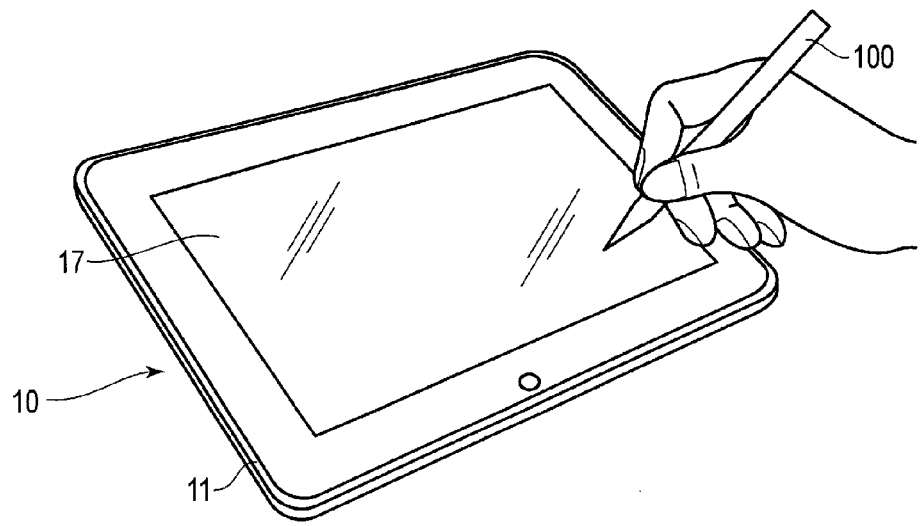
F I G. 1
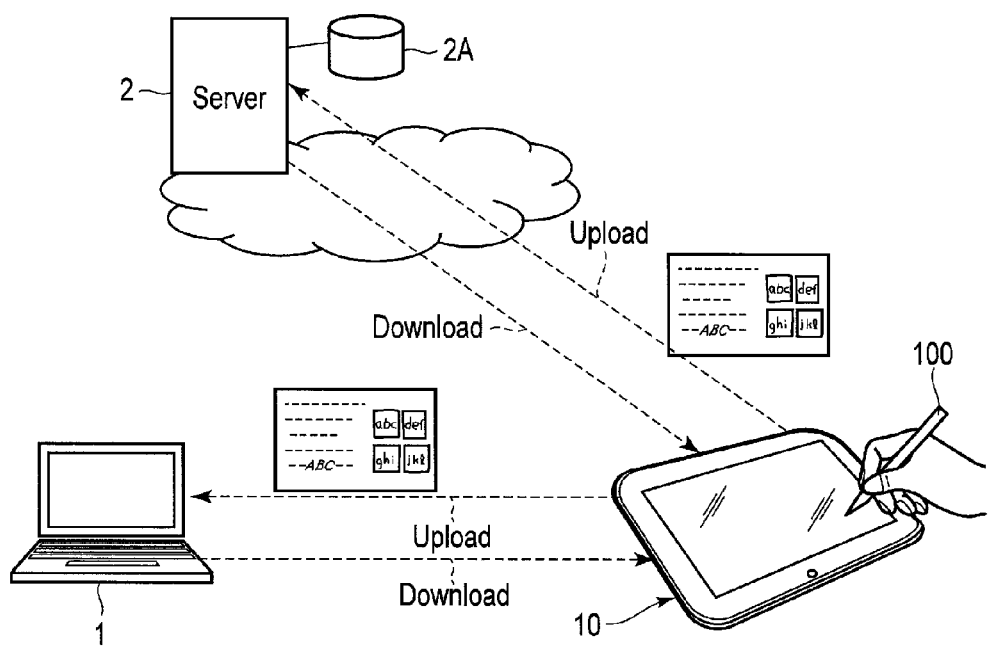
F I G. 2

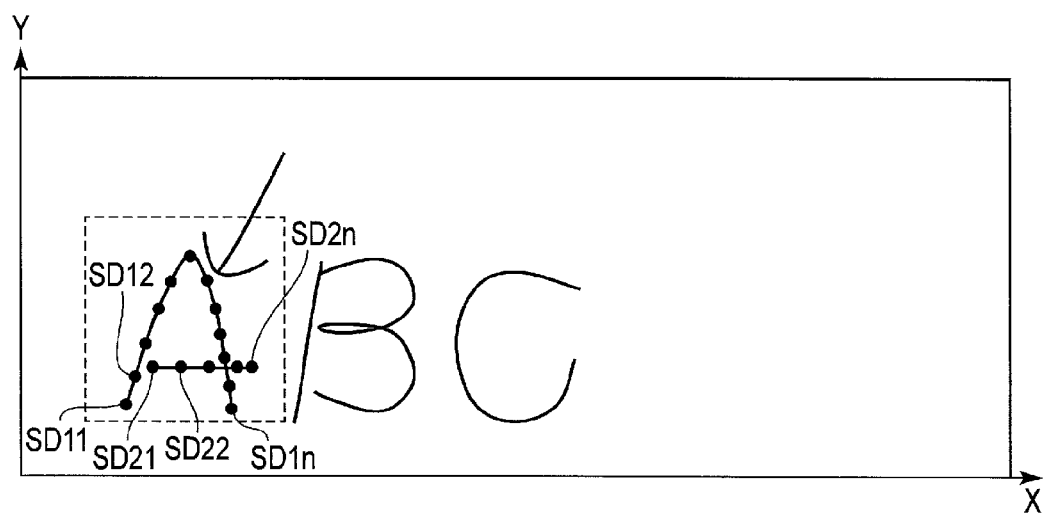
F I G. 3

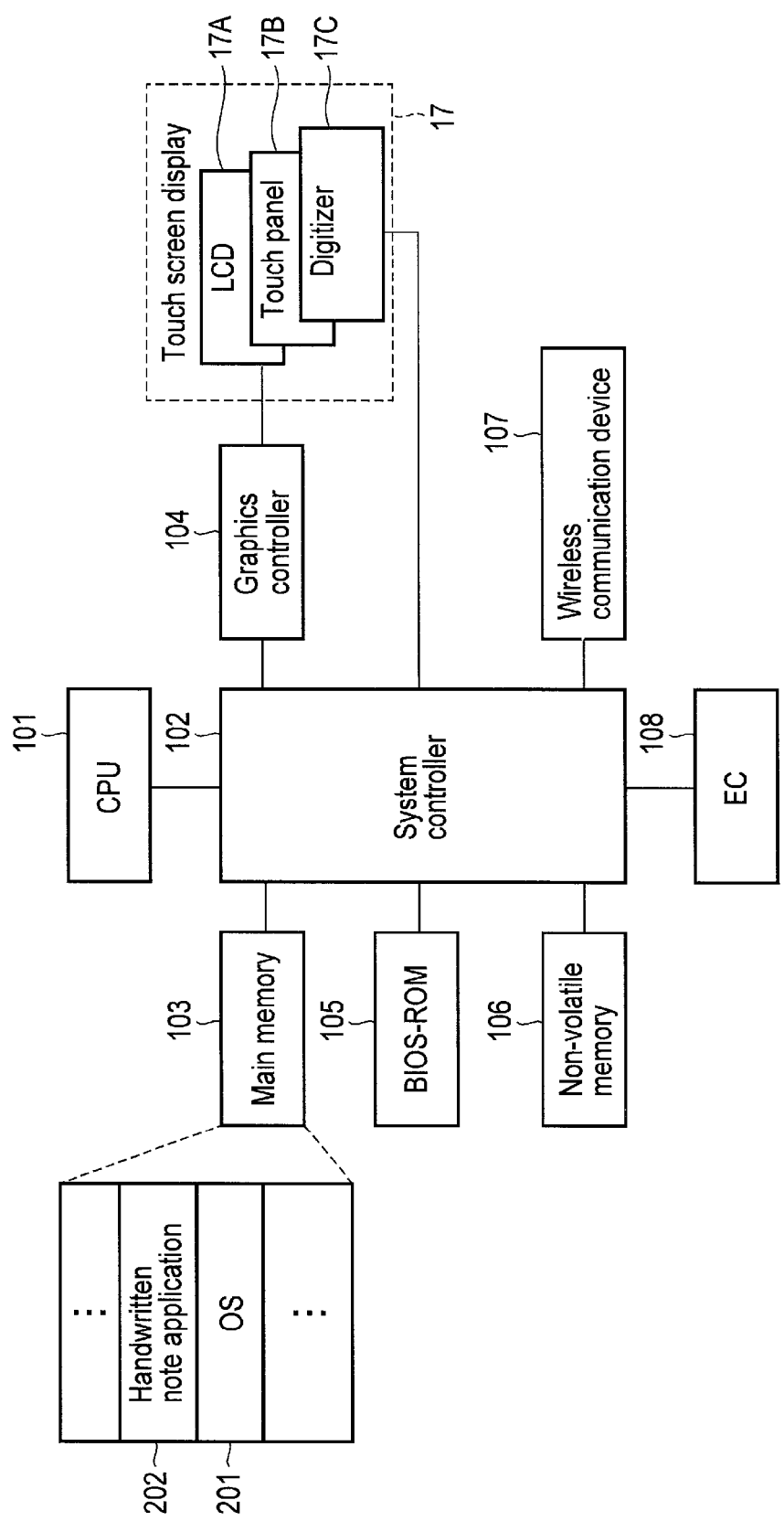
F I G. 5

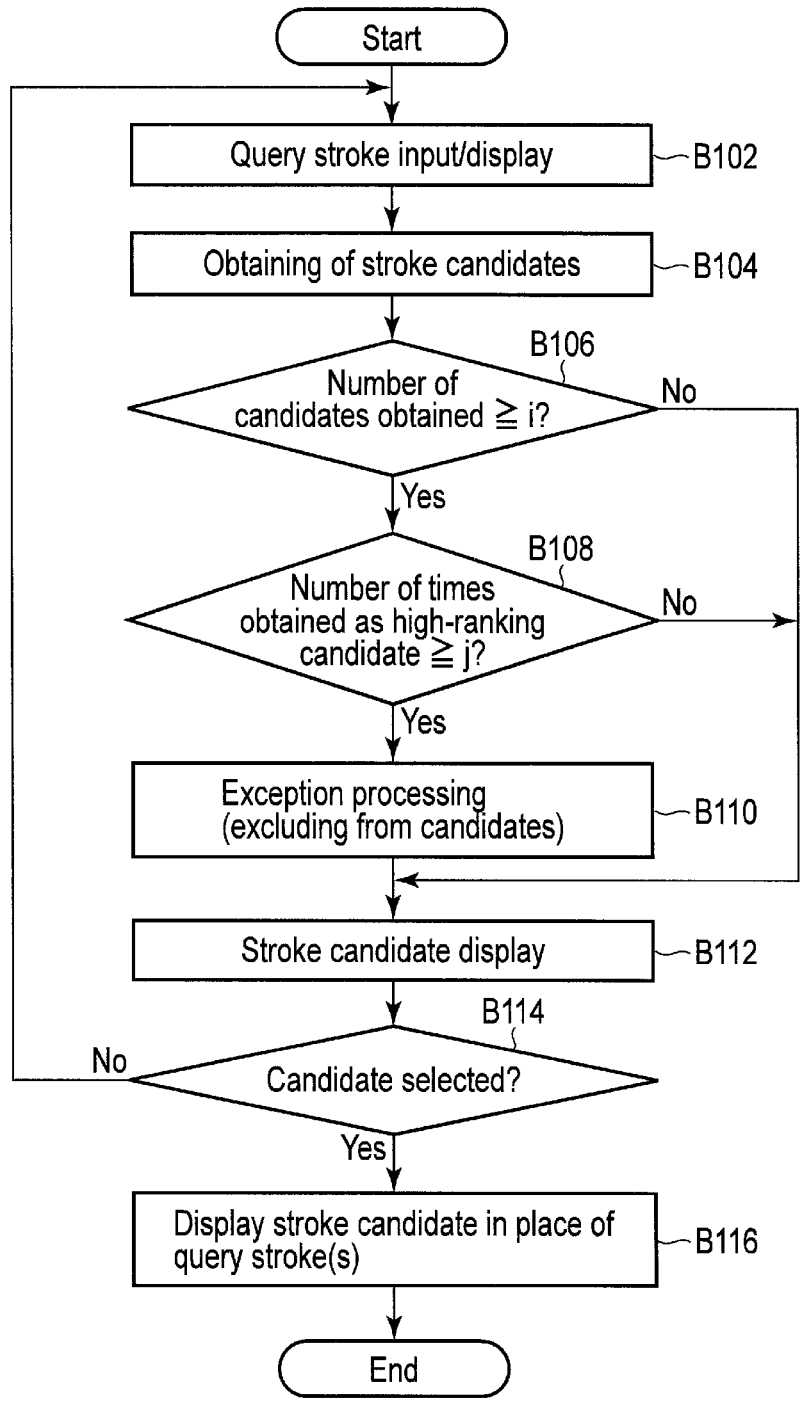
F I G. 10

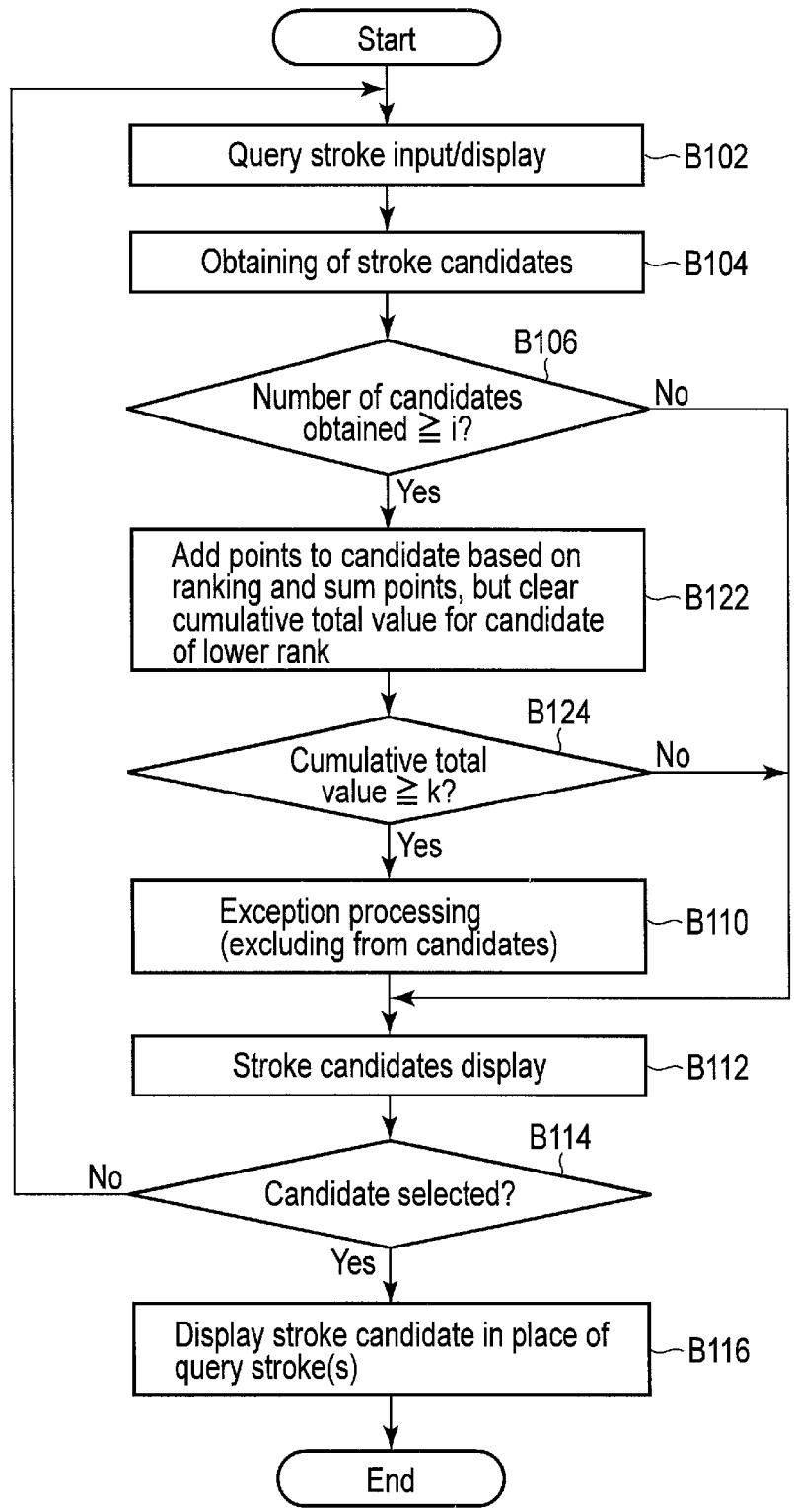
F I G. 12

ELECTRONIC DEVICE, METHOD AND COMPUTER READABLE MEDIUM

CROSS-REFERENCE TO RELATED APPLICATIONS

This application is based upon and claims the benefit of priority from Japanese Patent Application No. 2014-068839, filed Mar. 28, 2014, the entire contents of which are incorporated herein by reference.

FIELD

Embodiments described herein relate generally to handwriting input.

BACKGROUND

Recently, various electronic devices such as tablet computers, PDAs and smartphones have been developed. Many of these electronic devices include a touch screen display for facilitating input operations by the user. The user touches a menu or an object displayed on the touch screen with a finger or the like, thereby instructing the electronic device to execute a function associated with the menu or the object.

With regard to character input, an electronic device with a hardware keyboard is superior to a touch input electronic device. Conventionally, it has not been easy to smoothly input a number of characters by hand.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view of an external appearance of an electronic device of an embodiment.

FIG. 2 is an exemplary view of a cooperative operation of the electronic device of FIG. 1 with an external apparatus.

FIG. 3 illustrates an example of a handwritten document handwritten on the touch screen display of the electronic device of FIG. 1.

FIG. 5 is an exemplary block diagram showing a system configuration of the electronic device of FIG. 1.

FIG. 10 is an exemplary flowchart for explaining an example of a procedure of stroke completion processing executed by the electronic device of FIG. 1.

FIG. 12 is an exemplary flowchart for explaining another example of the procedure of the stroke completion processing executed by the electronic device of FIG. 1.

DETAILED DESCRIPTION

Figure 4:
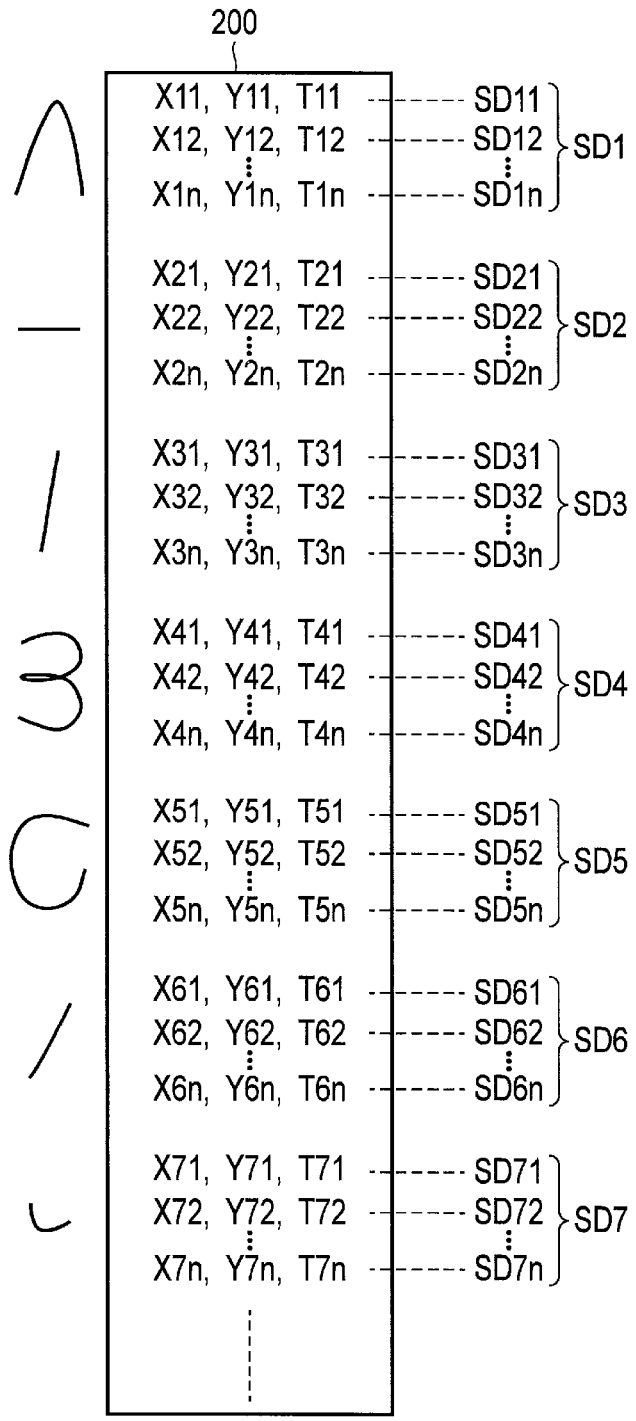
FIG. 4 is an exemplary view for explaining time-series data corresponding to the handwritten document of FIG. 3.

Various embodiments will be described hereinafter with reference to the accompanying drawings.

In general, according to one embodiment, an electronic device includes a receiver configured to receive a plurality of strokes input by handwriting; and circuitry. The circuitry is configured to determine, in response to completion of input of 1st to Mth strokes, where M is an integer greater than one, first input candidates of stroke groups by using the 1st to Mth strokes; execute process for displaying at least one of the first input candidates on a screen; determine, in response to completion of input of 1st to Nth strokes, where N is an integer greater than M, second input candidates by using the 1st to Nth strokes; and execute, when the at least one of the first input candidates displayed on the screen overlaps with any one of the second input candidates, process for displaying at least one of the second input candidates on the screen to eliminate overlap with the at least one of the first input candidates displayed on the screen.

FIG. 1 is a perspective view of an external appearance of an electronic device of an embodiment. The electronic device is, for example, a stylus-based portable device capable of handwriting input with a stylus or a finger. The electronic device may be realized as a tablet computer, a notebook computer, a Smartphone, a PDA or the like. Here, the electronic device is realized as a tablet computer 10. The tablet computer 10 is also called a tablet or a slate computer. The tablet computer 10 includes a body 11 and a touch screen display 17. The body 11 includes a thin box-shaped housing. The touch screen display 17 is mounted on the upper surface of the body 11 in such a manner as to be overlaid thereon.

The touch screen display 17 incorporates a flat panel display and a sensor therein. The sensor is configured to detect the contact position of a stylus or a finger on the screen of the flat panel display. The flat panel display is, for example, a liquid crystal display (LCD) device. As the sensor, for example, a capacitive touch panel, an electromagnetic induction digitizer or the like can be used. Here, both of these two kinds of sensors, namely, a digitizer and a touch panel are incorporated into the touch screen display 17.

The digitizer is provided, for example, below the screen of the flat panel display. The touch panel is provided, for example, on the screen of the flat panel display. The touch screen display 17 can detect not only a touch operation with a finger on the screen but also a touch operation with a stylus 100 on the screen. The stylus 100 may be, for example, an electromagnetic induction stylus. The user can perform a handwriting input operation on the touch screen display 17 with an external object (stylus 100 or finger). During the handwriting input operation, the locus of the movement of the external object (stylus 100 or finger), namely, the locus of a stroke input by hand is rendered in real time. In this way, the locus of each stroke is displayed on the screen. The locus of the movement of an external object while the external object is in contact with the screen corresponds to one stroke. A set of a number of strokes corresponding to a character, a figure or the like which is handwritten, namely, the set of a number of loci constitutes a handwritten document.

In the present embodiment, the handwritten document is stored in a storage medium not as image data but as time-series data indicative of the coordinate sequence of the locus of each stroke and the order relationship between strokes. The time-series data, which will be described later in detail with reference to FIG. 4, includes a plurality of items of stroke data corresponding to respective strokes and indicative of the order in which the strokes are handwritten. In other words, the time-series data is a set of items of time-series stroke data corresponding to respective strokes. Each item of stroke data corresponds to a certain stroke and includes a series of items of coordinate data (time-series coordinates) corresponding to respective points on the locus of the stroke. The sequence of these items of stroke data corresponds to the order in which respective strokes are handwritten, namely, the stroke order.

The tablet computer 10 can retrieve any time-series data which has already been stored in a storage medium to display on the screen a handwritten document corresponding to the time-series data, namely, strokes corresponding to respective items of stroke data indicated by the time-series data. Further, the tablet computer 10 includes an editing function. The editing function is capable of deleting or displacing any stroke, handwritten character or the like in a currently displayed handwritten document based on an editing operation by the user with an eraser tool, a selection tool and various other tools. Still further, the editing function includes a function of deleting a history of several handwriting operations.

Further, the tablet computer 10 includes a stroke completion function. The stroke completion function is a function of assisting a handwriting input operation by the user so as to facilitate input of a number of strokes by hand. More specifically, each time one stroke is handwritten, stroke groups input in the past are presented to the user as one or more stroke candidates, the stroke groups including one or more stroke groups which have been handwritten so far and predicted to be input by the user. In this way, the user does not always have to make all strokes, and thus the user can input a number of strokes easily by hand.

FIG. 2 illustrates an example of a cooperative operation of the tablet computer 10 with an external device. The tablet computer 10 can cooperate with a personal computer 1 and a cloud computing system. That is, the tablet computer 10 includes a wireless communication device such as a wireless LAN and is capable of performing a wireless communication with the personal computer 1. Further, the tablet computer 10 can establish a communication with a server 2 on the Internet. The server 2 may be a server performing an online storage service and various other cloud computing services.

The personal computer 1 includes a storage device such as a hard disk drive (HDD). The tablet computer 10 transmits time-series data (handwritten document) to the personal computer 1 over a network to store it in the HDD of the personal computer 1 (upload).

In this way, even when the capacity of the storage of the tablet computer 10 is small, the tablet computer 10 can handle a large number of items of time-series data (handwritten documents) or a large volume of time-series data (handwritten documents).

Further, the tablet computer 10 can retrieve any one or more handwritten documents stored in the HDD of the personal computer 1 (download). The tablet computer 10 can display loci of respective strokes indicated by the received handwritten documents on the screen of the touch screen display 17 of the tablet computer 10. In this case, a list of thumbnails obtained by reducing the sizes of the respective pages of the handwritten documents may be displayed on the screen of the touch screen display 17 or a single page selected from these thumbnails may be displayed on the screen of the touch screen display 17 in the standard size.

Still further, the correspondent of the communication with the tablet computer 10 may not be the personal computer 1 but may be the server 2 which is on the cloud computing system and provides a storage service or the like as described above. The tablet computer 10 transmits a handwritten document to the server 2 over a network to store it in a storage device 2A of the server 2 (upload). Further, the tablet computer 10 can retrieve any handwritten document stored in the storage device 2A of the server 2 (download). The tablet computer 10 can display loci of respective strokes indicated by the retrieved handwritten document on the screen of the touch screen display 17.

As described above, in the present embodiment, the storage medium storing a handwritten document may be any of a storage device in the tablet computer 10, a storage device in the personal computer 1 and a storage device of the server 2.

Next, the relationship between a stroke (character, mark, figure [diagram], table, etc.,) handwritten by the user and a handwritten document will be described with reference to FIGS. 3 and 4. FIG. 3 illustrates an example of a handwritten character string handwritten with the stylus 100 or the like on the touch screen display 17.

In handwritten documents, there are many cases where, on a character, figure, etc., having already been handwritten, another character, figure, etc., is further handwritten. In FIG. 3, a case where a handwritten character string "ABC" is handwritten in the order of "A", "B" and "C", and a handwritten arrow is then handwritten in immediate proximity to the handwritten character "A" is described.

The handwritten character "A" is represented by two strokes made with the stylus 100 or the like (locus in the form of "Λ" and locus in the form of "-"), that is, by two loci. The locus of the stylus 100 in the form of "Λ" made first is, for example, sampled at equal time intervals in real time, and thus the time-series coordinates of the "Λ" stroke SD11, SD12, . . . , SD1$n$ are obtained. Similarly, the locus of the stylus 100 in the shape of the "-" stroke made next is sampled at equal time intervals in real time, and thus the time-series coordinates of the "-" stroke SD21, SD22, . . . , SD2$n$ are obtained.

The handwritten character "B" is presented by two strokes handwritten with the stylus 100 or the like, namely, by two loci. The handwritten character "C" is represented by one stroke handwritten with the stylus 100 or the like, namely, by one locus. The handwritten "arrow" is presented by two handwritten strokes handwritten with the stylus 100 or the like, namely, by two loci.

FIG. 4 illustrates time-series data 200 corresponding to the handwritten character string of FIG. 3. The time-series data 200 includes a plurality of items of stroke data SD1, SD2, . . . , SD7. In the time-series data 200, these items of stroke data SD1, SD2, . . . , SD7 are listed in the stroke order, that is, in the order in which the strokes are handwritten, namely, in chronological order.

In the time-series data 200, the first two items of stroke data SD1 and SD2 indicate two strokes of the handwritten character "A", respectively. The third and fourth items of stroke data SD3 and SD4 indicate two strokes constituting the handwritten character "B", respectively. The fifth item of stroke data SD5 indicates one stroke constituting the handwritten character "C". The sixth and seventh items of stroke data SD6 and SD7 indicate two strokes constituting the handwritten "arrow", respectively.

Each item of stroke data includes a series of items of coordinate data (time-series coordinates) corresponding to one stroke, that is, a plurality of coordinates corresponding to respective points on the locus of one stroke. In each item of stroke data, coordinates are listed in the order in which the stroke is handwritten, namely, in chronological order. For example, as for the handwritten character "A", the item of stroke data SD1 includes a series of items of coordinate data (time-series coordinates) corresponding to the respective points on the locus of the "A stroke of the handwritten character "A", namely, n items of coordinates data SD11, SD12, ..., SD1n. The item of stroke data SD2 includes a series of items of coordinate data corresponding to the respective points on the locus of the "-" stroke of the handwritten character "A", namely, n items of coordinates data SD21, SD22, ..., SD2n. Note that the number of items of coordinate data may vary from item of stroke data to item of stroke data. That is, the locus of the stylus 100 is sampled at equal time intervals in real time, and therefore as a stroke becomes longer or a stroke is made more slowly, the number of items of its coordinate data increases.

Each item of coordinate data indicates an x-coordinate and a y-coordinate corresponding to a certain point on a corresponding locus. For example, the item of coordinate data SD11 indicates the x-coordinate (X11) and the y-coordinate (Y11) of the starting point of the "A" stroke. SD1n indicates the x-coordinate (X1n) and the y-coordinate (Y1n) of the end point of the "A" stroke.

Further, each item of coordinate data may include timestamp data T corresponding to a point in time when a point corresponding to the coordinates is handwritten. To each item of coordinate data, data indicative of writing pressure (Z) may be further added.

Still further, in the present embodiment, as described above, a handwritten document is stored not as a recognition result of an image or a character but as a set of items of time-series stroke data. Therefore, it is possible to handle a handwritten document regardless of the language of the handwritten characters. Consequently, the structure of the time-series data 200 of the present embodiment can be commonly used in various countries around the world in which different languages are used.

FIG. 5 illustrates a system configuration of the tablet computer 10.

The tablet computer 10 includes a CPU 101, a system controller 102, a main memory 103, a graphics controller 104, a BIOS-ROM 105, a non-volatile memory 106, a wireless communication device 107, an embedded controller (EC) 108 and the like.

The CPU 101 is a processor configured to control operations of various modules in the tablet computer 10. The CPU 101 executes various computer programs loaded from a storage device, namely, the non-volatile memory 106 to the main memory 103. These programs include an operating system (OS) 201 and various application programs. The application programs include a handwritten note application program 202. The handwritten note application program 202 includes a function of creating and displaying the above-mentioned handwritten document, a function of editing the handwritten document, a stroke completion function and the like.

The CPU 101 executes a basic input/output system (BIOS) stored in the BIOS-ROM 105. The BIOS is a program for hardware control.

The system controller 102 is a device configured to connect a local bus of the CPU 101 and various other components. The system controller 102 includes a built-in memory controller configured to perform access control of the main memory 103. Further, the system controller 102 includes a function of performing communication with the graphics controller 104 via a serial bus conforming to the PCI Express standard or the like.

The graphics controller 104 is a display controller configured to control an LCD17A used as a display monitor of the tablet computer 10. A display signal generated by the graphics controller 104 is transmitted to LCD17A. The LCD 17A displays a screen image based on the display signal. The LCD 17A is provided with a touch panel 17B and a digitizer 17C thereon. The touch panel 17B is a capacitive pointing device for performing input on the screen of the LCD 17A. A contact position touched with a finger on the screen, the movement of the contact position and the like are detected by the touch panel 17B. The digitizer 17C is an electromagnetic induction pointing device for performing input on the screen of the LCD 17A. A contact position touched with the stylus 100 on the screen, the movement of the contact position and the like are detected by the digitizer 17C.

The wireless communication device 107 is a device configured to establish a wireless communication such as a wireless LAN or 3G mobile communications. The tablet computer 10 is connected to the server 2 or the personal computer 1 by the wireless communication device 107 via the Internet or the like. The EC 108 is a single-chip microcomputer including an embedded controller for power control. The EC 108 includes a function of powering on or powering off the tablet computer 10 based on an operation of a power button by the user.

Figure 6:
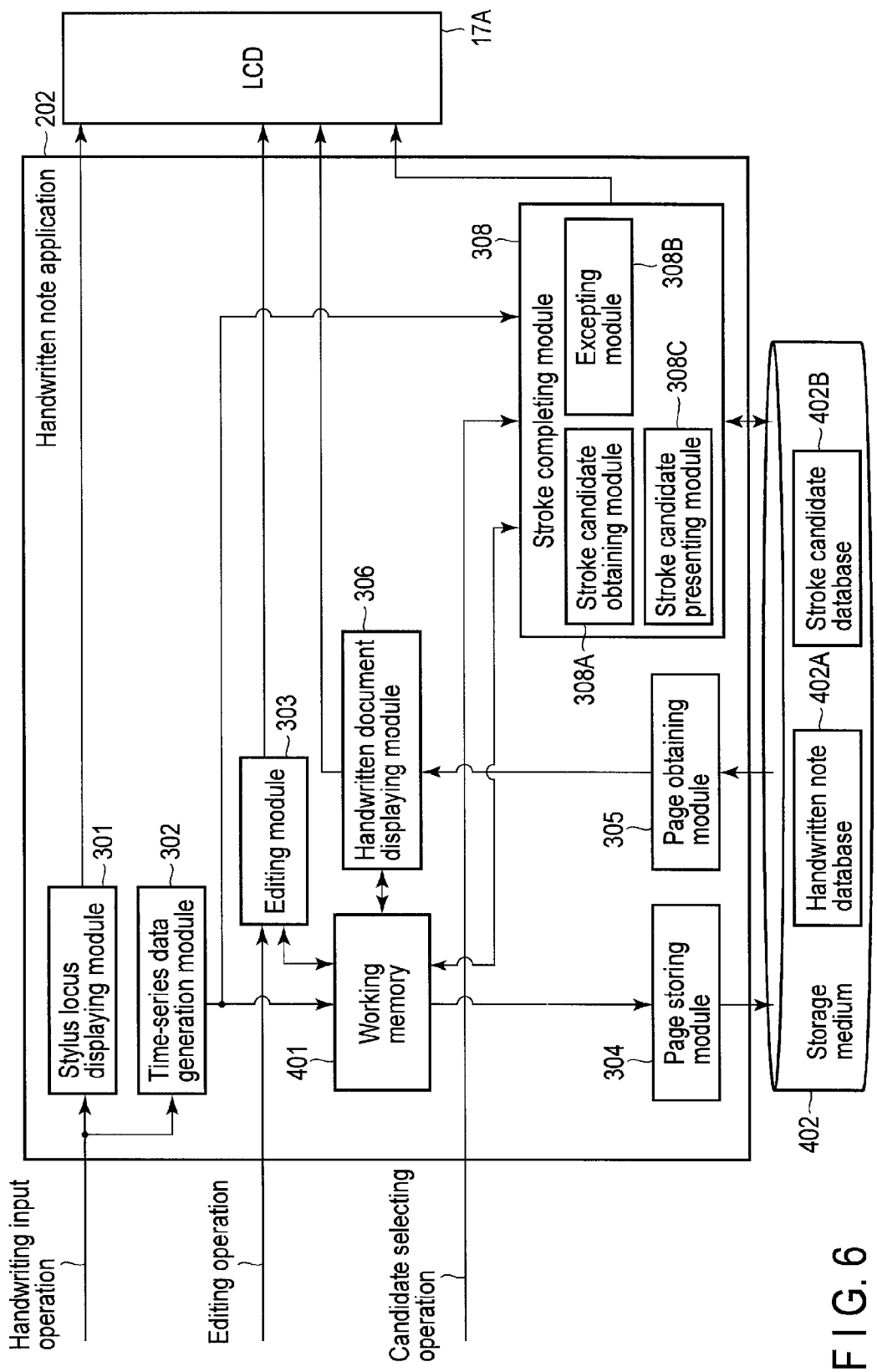
FIG. 6 is an exemplary block diagram showing a function configuration of a handwritten note application program executed by the electronic device of FIG. 1.

Next, with reference to FIG. 6, a function configuration of the handwritten note application program 202 will be described. The handwritten note application program 202 is a WYSIWYG application capable of handling handwritten document data. The handwritten note application program 202 includes, for example, a stylus locus displaying module 301, a time-series data generation module 302, an editing module 303, a page storing module 304, a page obtaining module 305, a handwritten document displaying module 306, a stroke completing module 308 and the like.

The handwritten note application program 202 uses stroke data input by means of the touch screen display 17 to create, display, and edit, etc., a handwritten document (handwriting data). The touch screen display 17 is configured to detect an occurrence of an event such as a touch, a move (slide), a release or the like. A touch is an event indicating that an external object is brought into contact with the screen. A move (slide) is an event indicating that an external object is moved while in contact with the screen. A release is an event indicating that an external object is released from the screen.

The stylus locus displaying module 301 and the time-series data generation module 302 receive a touch or move (slide) event generated by the touch screen display 17, thereby detecting a handwriting input operation. The touch event includes the coordinates of a contact position. The move (slide) event includes the coordinates of the place to which a contact position is moved. Therefore, the stylus locus displaying module 301 and the time-series data generation module 302 can receive a coordinate sequence corresponding to the locus of the movement of a contact position from the touch screen display 17.

The stylus locus displaying module 301 functions as a displaying module configured to display a stroke input by hand on the screen of the touch screen display 17. The stylus locus displaying module 301 receives a coordinate sequence from the touch screen display 17. Based on the coordinate sequence, the stylus locus displaying module 301 displays a plurality of strokes input by a handwriting input operation with the stylus 100 or the like on the screen of the LCD 17A in the touch screen display 17.

The time-series data generation module 302 receives the above-described coordinate sequence output from the touch screen display 17. Based on the coordinate sequence, the time-series data generation module 302 generates a plurality of items of stroke data corresponding to the above-described strokes. These items of stroke data, namely, coordinates corresponding to respective points of respective strokes may be stored temporarily in a working memory 401. The working memory 401 may be located in the main memory 103.

The page storing module 304 stores a handwritten document which includes a plurality of items of stroke data corresponding to a plurality of strokes, in a handwritten note database 402A in a storage medium 402. The storage medium 402 may be, as described above, any of a storage device in the tablet computer 10, a storage device in the personal computer 1 and a storage device of the server 2.

The page obtaining module 305 retrieves any handwritten document data from the storage medium 402. The retrieved handwritten document data is transmitted to the handwritten document displaying module 306. The handwritten document displaying module 306 analyzes the handwritten document data and displays, based on the result of the analysis, a plurality of loci of strokes indicated by a plurality of items of stroke data in the handwritten document data as a handwritten page on the screen.

The editing module 303 executes processing for editing a currently displayed handwritten document (handwritten page). That is, the editing module 303 executes, based on an editing operation performed by the user on the touch screen display 17, editing processing for deleting, moving or the like one or more strokes of a plurality of displayed strokes. Further, in order to reflect the result of editing processing in a displayed handwritten document, the editing module 303 updates the handwritten document.

The user can delete any of a plurality of displayed strokes with an eraser tool or the like. Further, the user can select any portion of a displayed handwritten page with a selection tool for circling or boxing any portion on the screen.

The stroke completing module 308 is configured to execute the above-described stroke completion function. The stroke completing module 308 obtains a stroke group corresponding to one or more strokes input by hand from the time-series data 200 (handwritten document data) input in the past and stored in the handwritten note database 402A. The stroke completing module 308 then recommends or suggests the obtained stroke group to the user by displaying on the screen the obtained stroke group as a stroke candidate for handwriting input completion. In other words, the stroke completing module 308 predicts, based on the one or more input strokes and the stored handwritten document data, a stroke group (for example, handwritten character string, handwritten figure or the like) which the user intends to input. The stroke completing module 308 executes processing for displaying the stroke group obtained by the prediction as a recommended (or suggested) stroke candidate on the screen. The number of candidates to be obtained may coincide with or may be larger than the number of candidates to be displayed at a time on the screen. Alternatively, stroke groups to be obtained may be ranked on the basis of a degree of correspondence to one or more strokes input by hand, and high-ranking stroke groups displayable at a time on the screen may be regarded as candidates and stroke groups ranked lower than them may not be regarded as candidates even if they are obtained.

In a case where a single candidate is obtained and displayed, strokes corresponding to the obtained stroke data is displayed in succession to an input stroke. For example, when a stroke "a" is input by hand, a stroke group beginning with a stroke "a" input in the past, for example, a handwritten word "access" is displayed as a stroke candidate. If the user performs an operation to adopt the stroke candidate "access" as input strokes, for example, such an operation to input a new stroke in a position to follow the stroke candidate "access", the stroke candidate "access" is adopted as input strokes and then becomes an input handwritten character string. In this way, the user does not always have to make all strokes, and thus the user can input a number of strokes easily by hand. If the stroke candidate "access" is not the strokes the user intends to input, the user only needs to ignore the display of the stroke candidate and continue writing the intended strokes. That is, the user makes the second stroke, for example, "p" on the second letter "c" of the stroke candidate "access". By doing so, a stroke group beginning with strokes "a" and "p" is obtained and displayed.

A recommended stroke candidate may not be limited to a handwritten word but may be a handwritten phrase. For example, when strokes "J" are input by hand, a handwritten character string "Jan. 13, 2014" input in the past may be displayed as a stroke candidate.

Therefore, a stroke candidate obtaining module 308A performs by background processing a morphological analysis of handwritten document data stored in the handwritten note database 402A, executes character recognition processing on a stroke set constituting a handwritten document and classifies all strokes constituting the handwritten document by morphemes, words, clauses or the like. A candidate is selected on the basis of these classification units.

In a case where a plurality of candidates are obtained and the obtained candidates are to be displayed simultaneously, since the number of stroke candidates displayable simultaneously on the screen is limited, mostly about three to five stroke candidates are obtained and displayed in list form. For example, when a stroke "a" is input by hand, handwritten words "apple", "area", "August" and the like are presented as candidates, and when a stroke "p" is then input, handwritten words "apple", "April", "application" and the like are presented as candidates. If the candidates include strokes which the user intends to input, by tapping or the like to select the candidate, the strokes having already been input by hand are replaced with the selected candidate to complete the handwriting input. Therefore, the user does not always have to make all strokes, and thus the user can input a number of strokes easily by hand. Note that, if fewer stroke candidates than the number of lines available for display can only be obtained, a blank line is created in the list.

In a case where candidates more than the number of lines available for simultaneous display on the screen are obtained, a scroll UI control or a wheel control capable of displaying all the obtained stroke candidates sequentially is used. In the case of the scroll control, three to five candidates are usually displayed, and when a scroll operation is performed, the next three to five candidates are displayed. In the case of the wheel control, only a single candidate is usually displayed, and when the wheel is spun, subsequent candidates are displayed one by one.

In order to readily obtain from the handwritten note database 402A a group of items of stroke data including one or more strokes input by the handwriting, the stroke completing module 308 may create a stroke candidate database 402B based on a set of strokes (handwritten document data) stored in the handwritten note database 402A. The stroke candidate database 402B may include a plurality of entries corresponding to a plurality of respective kinds of character strings. Each entry may store a group of items of stroke data corresponding to the character string of an entry. The stroke completing module 308 may first perform character recognition of one or more strokes input by the user. Further, the stroke completing module 308 refers to the stroke candidate database 402B and retrieves a character string the beginning of which coincides with the result of the character recognition (character string) of the one or more input strokes. The stroke completing module 308 obtains from the stroke candidate database 402B a group of items of stroke data corresponding to the retrieved character string as a group of items of stroke data corresponding to the one or more input strokes. Alternatively, each entry of the stroke candidate database 402B may store a group of items of stroke data corresponding to the character string of the entry and an amount of characteristics of each stroke in the group of items of stroke data. As an amount of characteristics of a certain stroke, any characteristics which can represent handwriting characteristics of the stroke may be used. For example, as the amount of characteristics, data of an amount of characteristics indicative of a stroke shape, a stroke handwritten direction, a stroke inclination, etc., may be used. In this case, the stroke completing module 308 may obtain a group of items of stroke data containing an amount of characteristics similar to that of one or more input strokes from the stroke candidate database 402B.

The stroke completing module 308 includes the stroke candidate obtaining module 308A, an excepting module 308B and a stroke candidate presenting module 308C. The stroke candidate obtaining module 308A refers to the stroke candidate database 402B and obtains groups of items of stroke data (stroke candidates) corresponding to one or more input strokes. The stroke candidate presenting module 308C displays on the screen to recommend to the user the obtained groups of items of stroke data as stroke candidates. If one of the one or more stroke candidates is selected by the user, the selected stroke candidate is adopted as input strokes. The excepting module 308B operates on the stroke candidate obtaining module 308A and the stroke candidate presenting module 308C to apply an exception rule to stroke candidate obtaining processing and stroke candidate presentation processing. From the beginning of making the first stroke to the selection of a candidate (completion of handwriting input of a certain character string) is called a session. During a session, each time one stroke is input, stroke groups corresponding to the combination of the input strokes are repeatedly obtained and displayed. When candidates are displayed, if there is a desired stroke group in the displayed candidates, the corresponding candidate is selected to end the session, but if there is no desired stroke group in the displayed candidates, a next stroke is input by hand. That is, a candidate still displayed at the time of the handwriting input of the next stroke can be regarded as an unnecessary candidate. The exception processing prevents such an unnecessary candidate from being obtained or displayed, and consequently a candidate with a high likelihood of selection is preferentially obtained and displayed. Note that the present embodiment is not limited the case where a candidate is immediately regarded as an unnecessary candidate when it is unselected after being displayed once, and may also include the case where a candidate is regarded as an unnecessary candidate if it is unselected after being displayed several times. A specific example of the exception processing will be described later.

Figure 7:
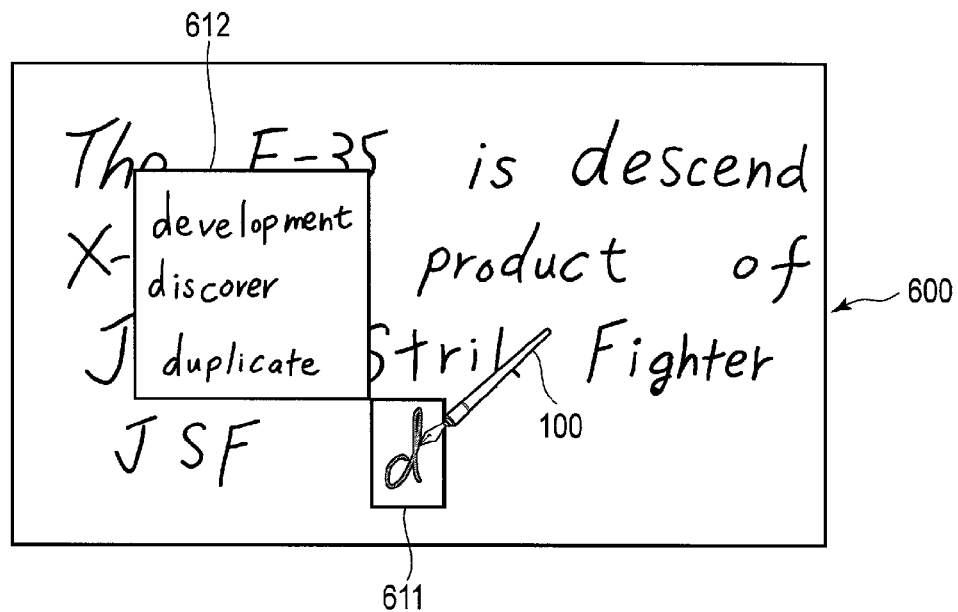
FIG. 7 is an exemplary view of an editing screen of a handwritten document for explaining a procedure of stroke completion processing executed by the electronic device of FIG. 1.

The processing of the stroke completing module 308 will now be described. For the sake of convenience of explanation, transition of the editing screen of a handwritten document in a case where an exception processing is not executed will be described. As shown in FIG. 7, when one stroke (query stroke) "d" is input by hand on a handwritten document editing screen 600, the input query stroke 611 is displayed on the editing screen 600. The stroke completing module 308 refers to the stroke candidate database 402B to obtain stroke groups corresponding to the query stroke "d". For example, the following descriptions are presented given that the user intends to input a handwritten character string "development" after a character string "JSF". Here, a case where handwritten character strings "development", "discover" and "duplicate" have already been stored in the stroke candidate database 402B is described. Adjacent to the stroke input by hand, a stroke candidate window 612 is displayed, and these three handwritten character strings are displayed therein. The candidates are respectively ranked when they are obtained, and are displayed in the order of ranking. When four or more candidates are obtained, the top three candidates are displayed and candidates ranked lower than third will not be displayed.

Figure 8:
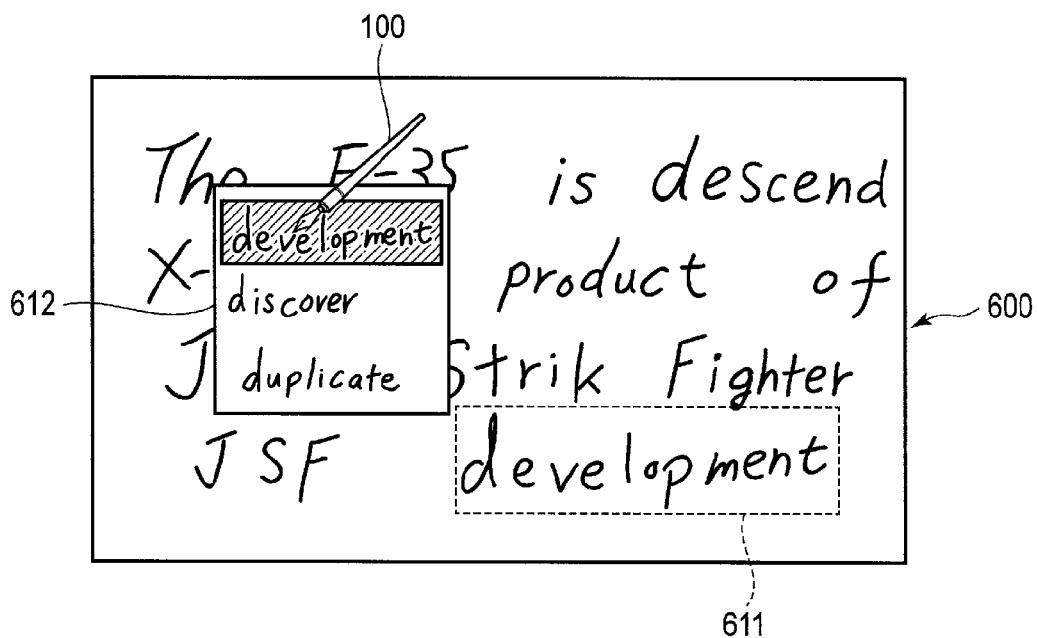
FIG. 8 is an exemplary view of an editing screen of a handwritten document for explaining a procedure of stroke completion processing executed by the electronic device of FIG. 1.

As shown in FIG. 8, when the handwritten character string "development" in the candidates is selected, the selected character string "development" is adjusted in size to conform to the size of the surrounding handwriting and then displayed in place of the query stroke 611 displayed on the editing screen 600.

Figure 9:
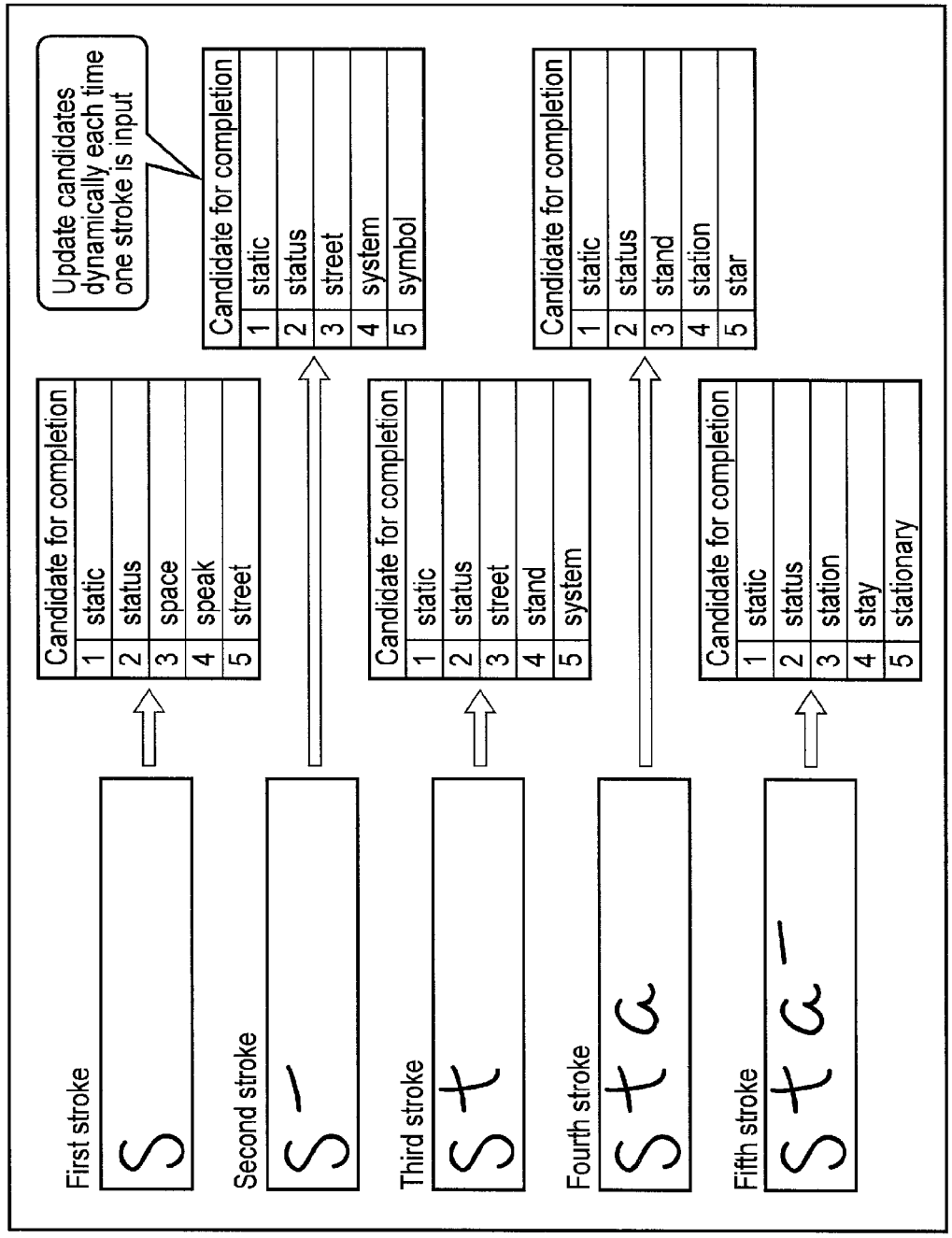
FIG. 9 is an exemplary view of query stroke transition and stroke candidate transition for explaining a procedure of stroke completion processing executed by the electronic device of FIG. 1.

FIG. 9 illustrates another example of the query stroke and the stroke candidate. The following descriptions are presented given that the first query stroke "s", the second query stroke a "horizontal line of t", the third query stroke a "vertical line of t", the fourth query stroke "a" and the fifth query stroke a "horizontal line of t" are input in this order.

When the first query stroke "s" is input, five candidates "static", "status", "space", "speak" and "street" are displayed. When the second query stroke the "horizontal line of t" is input, five candidates "static", "status", "street", "system" and "symbol" are displayed. When the third query stroke the "vertical line of t" is input, five candidates "static", "status", "street", "stand" and "system" are displayed. The forth query stroke "a" is input, five candidates "static", "status", "stand", "station" and "star" are displayed. The fifth query stroke the "horizontal line of t" is input, five candidates "static", "status", "station", "stay" and "stationary" are displayed.

The stroke candidate obtaining module 308A repeatedly obtains stroke candidates again each time one stroke is input and query strokes change. Therefore, stroke candidates to be obtained are dynamically updated, but since the rankings of candidates are determined based on the contexts, the number of times of selection in the past or the like, in this example, when the first to fifth strokes are input, "static" and "status" are repeatedly displayed as the first and second candidates, respectively. Such repetitious display a candidate as in the above case means that the candidate is not selected and a stroke is further input by handwritten. Such a candidate can be regarded as a candidate with an extremely low likelihood of selection, and in the present embodiment, exception processing for prohibiting such an unnecessary candidate from being displayed is performed even if it is obtained.

Figure 11:
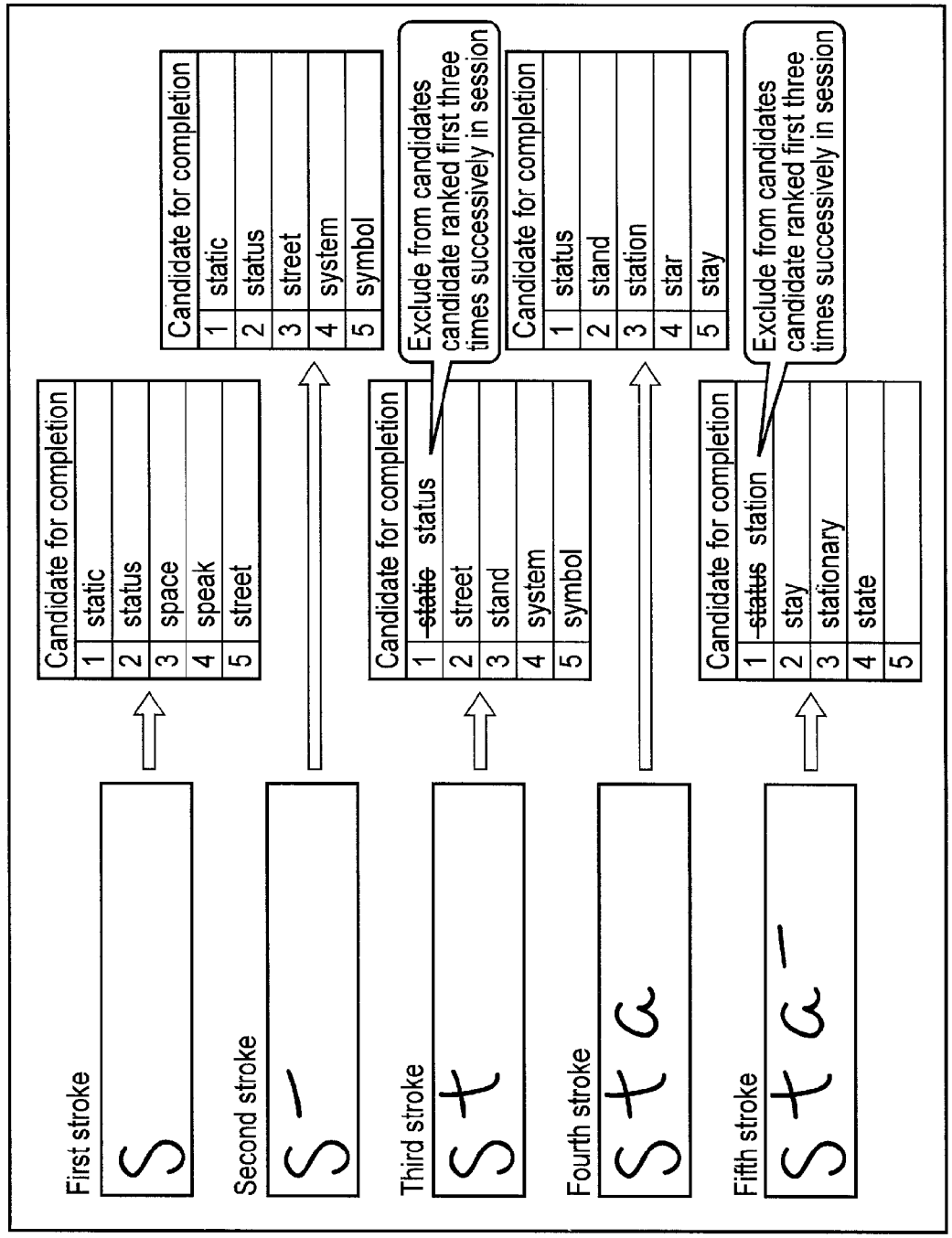
FIG. 11 is an exemplary view of query stroke transition and stroke candidate transition for explaining a procedure of stroke completion processing executed by the electronic device of FIG. 1.

The flowchart of FIG. 10 illustrates an example of the procedure of stroke completion processing including exception processing. FIG. 11 illustrates the relationship between the query strokes and the display of the stroke candidate window 612 during the operations of FIG. 10. The stroke candidate window 612 shows five candidates.

When one query stroke is input by a handwriting input operation on the handwritten document editing screen, input query strokes (in the case of the second and the following strokes, a total number of strokes from the first stroke) are displayed on the editing screen (block B102). The stroke completing module 308 refers to the stroke candidate database 402B and obtains stroke candidates corresponding to the input strokes (block B104). If the first query stroke is "s", five candidates "static", "status", "space", "speak" and "street" are obtained and displayed in a manner similar to that of FIG. 9. The stroke candidate obtaining module 308A first obtains stroke groups including the query strokes, namely, candidates, and then ranks the obtained candidates in consideration with the number of selection, the contents or the like. When the number of candidates to be displayed simultaneously is determined, candidates are obtained just as many as the number from the top. However, depending on a query stroke, there are some cases where only candidates fewer than the number of candidates to be displayed are obtained.

In block B106, it is determined whether or not the number of the obtained candidates is "i" (four, for example) or more is determined. Note that, since the exception processing is for prohibiting a candidate from being obtained or from being displayed even if obtained, when the number of candidates obtained is small, the number of candidates to be displayed will be extremely small. Therefore, this step is here for not executing the exception processing in such a case. Only in a case where four or five candidates are obtained, the exception processing is executed.

When it is determined in block B106 that the number of the obtained candidates is four or more, in block B108, it is determined for each candidate whether or not the high-ranking candidate (for example, ranked first) is obtained "j" or more (three, for example) times in the current session. That is, if a candidate is not selected even after obtained three times (displayed twice) as ranked first, it is possible to regard the candidate as an unnecessary candidate with an extremely low likelihood of selection. The high-ranking candidate may not be limited to a candidate ranked first but may also include candidates ranked second and third. Further, the determination may not necessarily be based on the number of times obtained in the same rank but may be based on the number of times obtained in top three ranks. That is, it is determined in block B108 whether or not a stroke candidate was obtained as a high-ranking candidate a predetermined number of times or more in the past.

When it is determined in block B108 that a candidate is obtained three or more times in the current session, the candidate is excluded from candidates (exception processing). Subsequently, stroke candidates are displayed in block B112.

When it is determined in block B106 that less than four candidates are obtained or it is determined in block B108 that a candidate is obtained less than three times, the exception processing is not executed in block B110 and the display of the candidate is immediately performed in block B112.

In this way, in block B112, candidates obtained in block B104 and not excluded in block B110 are displayed. Thus, although the stroke candidate obtaining module 308A obtains a stroke group including query strokes, those which is selected many times as a candidate in a single session is not displayed. Consequently, a candidate with a low likelihood of selection will not be displayed.

After candidates are displayed, it is determined in block B114 whether or not any candidate is selected. If one candidate is selected, in block B116, the selected candidate is adjusted in size to conform to the size of the surrounding strokes and then displayed in place of the query stroke 611 displayed on the editing screen.

When no candidate is selected in block B114, the step is set back to block B102 again to continue the query stroke input, and a next stroke is further input.

In this way, a candidate with a low likelihood of selection is not displayed and a stroke candidate with a high likelihood of selection is displayed, and therefore it is possible to facilitate input of a number of characters by hand.

In the flowchart of FIG. 10, until the second query stroke a "horizontal line of t" shown in FIG. 11 is input, five candidates "static", "status", "street", "system" and "symbol" are displayed in a manner similar to that of FIG. 9. However, when the third query stroke a "vertical line of t" is input, although five candidates "static", "status", "street", "stand" and "system" are obtained, since the first-ranking "static" is obtained three times and thus excluded from candidates, the display of the stroke candidate "static" is cancelled, the candidates ranked second to fifth move up by one rank in order and four candidates "status", "street", "stand" and "system" are displayed, and further "symbol" is displayed as the fifth candidate.

When the fourth query stroke "a" is input, five candidates "status", "stand", "station", "star" and "stay" are displayed. When the fifth query stroke "horizontal line of t" is input, although five candidates "status", "station", "stay", "stationary" and "state" are obtained, since the first-ranking "status" is obtained three times and thus excluded from candidates, the display of the stroke candidate "status" is cancelled, the candidates ranked second to fifth move up by one rank, and four candidates "station", "stay", "stationary" and "state" are displayed. In this case, no more candidates are obtained, and thus the row of the fifth candidate is a blank.

The flowchart of FIG. 12 illustrates another example of the procedure of the stroke completion processing including the exception processing. Block B102 (query stroke input), block B104 (obtaining of stroke candidates) and block B106 (determination of the number of candidates obtained) are the same as those of the flowchart of FIG. 10. Note that, in the case of FIG. 10, the number of stroke candidates to be obtained is made equal to the number of candidates displayable simultaneously, however, in the case of FIG. 12, the number of stroke candidates to be obtained may be larger than the number of candidates displayable simultaneously.

When it is determined in block B106 that the number of obtained candidates is four or more, in block B122, points based on the rankings are added to the candidates, respectively. For example, when ten candidates are obtained, ten points to one ranked first, nine points to one ranked second, . . . , one point to one ranked tenth are added, and then the cumulative total value of points added to each candidate is calculated. Note that, when a candidate is ranked eleventh or lower, its cumulative total value is cleared.

In a block B124, it is determined whether or not the cumulative total value of each candidate is a predetermined value k (30, for example) or more. A large cumulative total value of a candidate means that the candidate was not selected even after obtained frequently in the past as a high-ranking candidate, and thus it is possible to regard it as an unnecessary candidate with an extremely low likelihood of selection.

A candidate determined in block B124 to have a cumulative total value of 30 or more is excluded from candidates in block B110 (exception processing). Subsequently, stroke candidates are displayed in block B112 in a manner similar to that of FIG. 10.

Also in the example of FIG. 12, a candidate with a low likelihood of selection is not displayed and a stroke candidate with a high likelihood of selection is displayed, and therefore it is possible to facilitate input of a number of characters by hand.

Figure 13:
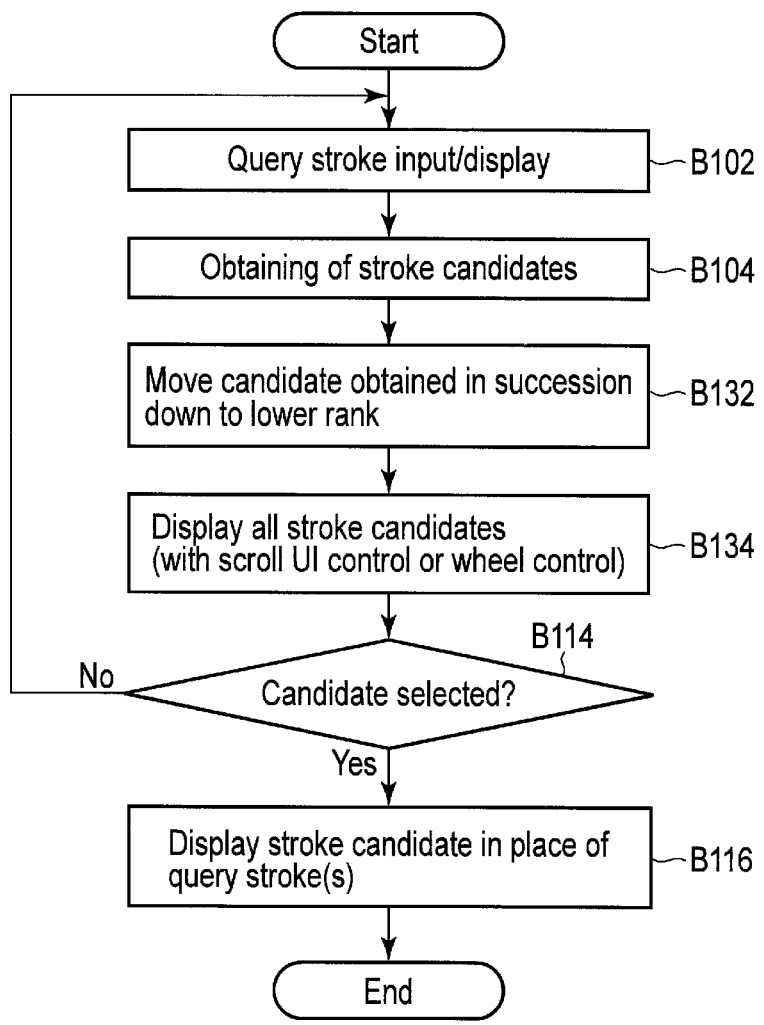
FIG. 13 is an exemplary flowchart for explaining another example of the procedure of the stroke completion processing executed by the electronic device of FIG. 1.

The flowchart of FIG. 13 illustrates another example of the procedure of the stroke completion processing including the exception processing. Block B102 (query stroke input) and block B104 (obtaining of stroke candidates) are the same as those of the flowchart of FIG. 10. Note that, in the case of FIG. 10, the number of the stroke candidates to be obtained is made equal to the number of candidates displayable simultaneously, but in the case of FIG. 13, the number of stroke candidates to be obtained may be larger than the number of candidates displayable simultaneously.

In block B132, when a high-ranking candidate is also obtained at the time of input of the previous stroke, the rank of the candidate is lowered. For example, a candidate obtained twice in succession and ranked second or higher is moved down to, for example, the fifth rank.

In a block B134, candidates are displayed. Although it is possible that only a predetermined number of those from the top are displayed as in FIG. 11, here all candidates are displayed in order from the top by means of a scroll UI control or a wheel control. Therefore, even when a candidate is obtained by the stroke candidate obtaining module 308A in a high rank, if it has already been obtained at the time of input of the previous stroke, the priority of the candidate is lowered such that it will not be displayed preferentially, a candidate with a high likelihood of selection will be displayed instead, and it becomes possible to facilitate input of a number of characters by hand.

Note that, since various processing of the present embodiment may be realized by a computer program, the effect similar to that of the present embodiment may be easily achieved simply by installing the computer program in a computer via a computer readable storage medium storing the computer program.

The CPU in the computer installing the computer program therein can function as a processor configured to execute the above-described stroke completion processing. The CPU in the computer can function as a display processor configured to display strokes on the screen.

Further, in the present embodiment, the case where a tablet computer is used is described as an example, but the handwritten document processing function of the present embodiment is adoptable to an ordinary desktop personal computer. In that case, it is only necessary to connect an input device for handwriting input such as a tablet computer to the desktop personal computer.

Note that the above described is a configuration to display a stroke candidate at the stage of input of one or more strokes corresponding to a part of a certain handwritten character, but such a configuration as to display a candidate once an entire handwritten character has been input may be adopted as well.

In the examples of FIGS. 10 and 12, from the time-series data 200 (handwritten document data) input in the past and stored in the handwritten note database 402A, a stroke group corresponding to one or more strokes input by hand is obtained and the obtained candidate is displayed. The concepts of the candidate, however, are not limited to the above case. That is, instead of using a UI for displaying all obtained candidates, it is possible to obtain a number of candidates and display only some high-ranking candidates thereof, or to rank obtained stroke groups and regard only high-ranking candidates thereof as candidates to be displayed. Further, a candidate display UI may be configured to display only a predetermined number of candidates simultaneously or may be configured to display candidates in order by scrolling, spinning a wheel or the like. That is, any UI may be appropriate as long as it is capable of avoiding the repetitious display as a high-ranking candidate of a stroke group which is no longer selected even once obtained as a high-ranking candidate in the past.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display capable of detecting strokes made on a screen of the display and displaying the strokes on the screen; and
a hardware processor configured to:
receive 1st to Mth strokes made on the screen respectively where M is an integer larger than one;
determine Mth input candidates according to the 1st to Mth strokes, wherein the Mth input candidates have respectively Mth priorities determined based on the 1st to Mth strokes;
display both the 1st to Mth strokes and a subset of the Mth input candidates on the screen according to the Mth priorities, the subset of the Mth input candidates have higher Mth priorities than Mth priorities of Mth input candidates which are not displayed;
input one of the subset of the Mth input candidates if the one of the subset of the Mth input candidates is selected by a user;
receive Nth stroke made on the screen where N is an integer larger than M;
determine Nth input candidates according to 1st to Nth strokes, wherein the Nth input candidates have respectively Nth priorities determined based on the 1st to Nth strokes; and
display both the 1st to Nth strokes and a subset of the Nth input candidates on the screen according to the Nth priorities, the subset of the Nth input candidates have higher Nth priorities than Nth priorities of Nth input candidates which are not displayed;
wherein if the Mth to Nth input candidates comprise same first candidate, the hardware processor is further configured to exclude the first candidate from the subset of the Nth input candidates even if the first candidate has higher Nth priority than Nth priorities of Nth input candidates which are not displayed.

2. The electronic device of claim 1, wherein the hardware processor is configured to display, if the one of the Mth input candidates is selected, the selected candidate in place of the 1st to Mth strokes.

3. The electronic device of claim 1, wherein each of the Mth priorities is indicative of a degree of correspondence between the 1st to Mth strokes and each of the Mth input candidates and each of the Nth priorities is indicative of a degree of correspondence between the 1st to Nth strokes and each of the Nth input candidates.

4. The electronic device of claim 2, wherein each of the Mth priorities is indicative of a number of times when each of the Mth input candidates is consecutively displayed and each of the Nth priorities is indicative of a number of times when each of the Nth input candidates is consecutively displayed.

5. The electronic device of claim 1, wherein each of the Mth priorities is indicative of a total number of times when each of the Mth input candidates is displayed and each of the Nth priorities is indicative of a number of times when each of the Nth input candidates is displayed.

6. The electronic device of claim 1, wherein each of the Mth priorities is indicative of a cumulative point of a degree of correspondence between the 1st to Mth strokes and each of the Mth input candidates and each of the Nth priorities is indicative of a cumulative point of a degree of correspondence between the 1st to Nth strokes and each of the Nth input candidates.

7. The electronic device of claim 6, wherein the cumulative point is lower if the degree of correspondence is high.

8. The electronic device of claim 6, wherein the hardware processor is configured to clear the cumulative point when the cumulative point is lower than a predetermined number.

9. A display method for an electronic device comprising a display capable of detecting strokes made on a screen of the display and displaying the strokes on the screen, the method comprising:
- receiving 1st to Mth strokes made on the screen respectively where M is an integer larger than one;
- determining Mth input candidates according to the 1st to Mth strokes, wherein the Mth input candidates have respectively Mth priorities determined based on the 1st to Mth strokes;
- displaying both the 1st to Mth strokes and a subset of the Mth input candidates on the screen according to the Mth priorities, the subset of the Mth input candidates have higher Mth priorities than Mth priorities of Mth input candidates which are not displayed;
- inputting one of the subset of the Mth input candidates if the one of the subset of the Mth input candidates is selected by a user;
- receiving Nth stroke made on the screen where N is an integer larger than M;
- determining Nth input candidates according to 1st to Nth strokes, wherein the Nth input candidates have respectively Nth priorities determined based on the 1st to Nth strokes; and
- displaying both the 1st to Nth strokes and a subset of the Nth input candidates on the screen according to the Nth priorities, the subset of the Nth input candidates have higher Nth priorities than Nth priorities of Nth input candidates which are not displayed;
- wherein if the Mth to Nth input candidates comprise same first candidate, the method further comprises excluding the first candidate from the subset of the Nth input candidates even if the first candidate has higher Nth priority than Nth priorities of Nth input candidates which are not displayed.

10. The display method of claim 9, wherein each of the Mth priorities is indicative of a degree of correspondence between the 1st to Mth strokes and each of the Mth input candidates and each of the Nth priorities is indicative of a degree of correspondence between the 1st to Nth strokes and each of the Nth input candidates.

11. The display method of claim 9, wherein each of the Mth priorities is indicative of a cumulative point of a degree of correspondence between the 1st to Mth strokes and each of the Mth input candidates and each of the Nth priorities is indicative of a cumulative point of a degree of correspondence between the 1st to Nth strokes and each of the Nth input candidates.

12. A non-transitory computer readable medium having a plurality of executable instructions stored thereon configured to cause one or more computers to perform processing, the processing comprising:
- receiving 1st to Mth strokes made on a screen respectively where M is an integer larger than one;
- determining Mth input candidates according to the 1st to Mth strokes, wherein the Mth input candidates have respectively Mth priorities determined based on the 1st to Mth strokes;
- displaying both the 1st to Mth strokes and a subset of the Mth input candidates on the screen according to the Mth priorities, the subset of the Mth input candidates have higher Mth priorities than Mth priorities of Mth input candidates which are not displayed;
- inputting one of the subset of the Mth input candidates if the one of the subset of the Mth input candidates is selected by a user;
- receiving Nth stroke made on the screen where N is an integer larger than M;
- determining Nth input candidates according to 1st to Nth strokes, wherein the Nth input candidates have respectively Nth priorities determined based on the 1st to Nth strokes; and
- displaying both the 1st to Nth strokes and a subset of the Nth input candidates on the screen according to the Nth priorities, the subset of the Nth input candidates have higher Nth priorities than Nth priorities of Nth input candidates which are not displayed;
- wherein if the Mth to Nth input candidates comprise same first candidate, the method further comprises excluding the first candidate from the subset of the Nth input candidates even if the first candidate has higher Nth priority than Nth priorities of Nth input candidates which are not displayed.

13. The computer readable medium of claim 12, wherein each of the Mth priorities is indicative of a degree of correspondence between the 1st to Mth strokes and each of the Mth input candidates and each of the Nth priorities is indicative of a degree of correspondence between the 1st to Nth strokes and each of the Nth input candidates.

14. The computer readable medium of claim 12, wherein each of the Mth priorities is indicative of a cumulative point of a degree of correspondence between the 1st to Mth strokes and each of the Mth input candidates and each of the Nth priorities is indicative of a cumulative point of a degree of correspondence between the 1st to Nth strokes and each of the Nth input candidates.

* * * * *